US005546893A

United States Patent [19]
Stone

[11] Patent Number: 5,546,893
[45] Date of Patent: Aug. 20, 1996

[54] BIRD ENCLOSURES

[76] Inventor: Roger H. Stone, 19 St. Patricks Rd., Yeovil, Somerset, BA1 3EX, United Kingdom

[21] Appl. No.: 298,959

[22] Filed: Sep. 1, 1994

[30] Foreign Application Priority Data

Sep. 1, 1993 [GB] United Kingdom ............... 9318112

[51] Int. Cl.⁶ ............................................. A01K 31/06
[52] U.S. Cl. ........................... 119/464; 119/459; 119/481
[58] Field of Search .................................. 119/15, 17, 18, 119/19, 165, 72.5

[56] References Cited

U.S. PATENT DOCUMENTS

| 174,274 | 2/1876 | Meyers | 119/17 |
|---|---|---|---|
| 3,251,342 | 5/1966 | Kay | 119/72.5 X |
| 3,572,293 | 3/1971 | Schroen | 119/18 |
| 4,998,506 | 3/1991 | Frostad | 119/18 |
| 5,054,426 | 10/1991 | Panarelli et al. | 119/17 |
| 5,429,800 | 7/1995 | Miraldi et al. | 119/18 X |

FOREIGN PATENT DOCUMENTS

| 1037154 | 7/1966 | United Kingdom . |
|---|---|---|
| 1301237 | 12/1972 | United Kingdom . |

*Primary Examiner*—Robert P. Swiatek
*Assistant Examiner*—Yvonne R. Abbott
*Attorney, Agent, or Firm*—Young & Thompson

[57] ABSTRACT

A bird enclosure is constructed from two interengaging sections 1 and 7 which are nested within one another to create a cavity between the overlapping side walls 2 and 8. This cavity provides a space to receive a feed tube 17 leading from a water reservoir 15 down to a feed valve which projects into the interior of the enclosure. The front wall of the enclosure will be a mesh panel through which the birds can be viewed.

8 Claims, 3 Drawing Sheets

BIRD ENCLOSURES

At competitive bird shows (for budgerigars in particular) it is usual practice for all the entrants to be displayed in an enclosure of a common design. Such enclosures are relatively simple in construction but suffer from certain drawbacks in terms of robustness of construction, suitable access to the interior and the provision of an acceptable means for providing a water supply.

In accordance with the present invention there is provided a bird enclosure of generally rectangular design, and formed from two interengaging sections which nest within one another to create at least one double side wall defining a cavity in that side wall, the front wall of the enclosure incorporating a mesh viewing panel.

Manufacturing the enclosure in this manner enables the sections from which it is constructed to be formed from plastics materials which give the enclosure a degree of robustness whilst not compromising on the amount of space within the enclosure (indeed it may even be possible to increase the internal space). The provision of the double side walls not only provides strength for the enclosure but also allows for two particular improvements. Firstly, a water reservoir may be mounted outside the interior of the enclosure and a supply tube from the reservoir will when lead down through the side wall cavity to a feed valve within the enclosure. The bird is, therefore, provided with a fresh water supply which cannot be soiled.

In accordance with normal practice the top interior wall of the enclosure will ideally incline down from the front to the rear. Advantageously, this inclined wall will be formed as part of one of the interengaging sections whilst a horizontal top wall extends additionally as part of the other section from the front of the enclosure over the inclined wall. This will provide a space between the two top walls within which the water reservoir can be incorporated.

Another advantage of the double-sided wall is that a door can be formed in the side wall with an integral latch on the door positioned to slide into the side wall cavity in order to lock the door. Ideally, a locking member will be provided which can be actuated to drive the latch into or retain the latch in the closed condition. This locking member can be a screw-threaded bolt actuable by a key, or a lever-operated arm acting on the latch. If the locking member is arranged to be actuated from the rear of the enclosure, then it will not be immediately accessible, thus providing a significant deterrent to possible thieves.

In the preferred arrangement an outer one of the interengaging sections comprises a top, base, front and side walls and an inner one of the interengaging sections comprises a top, base, rear and side walls arranged to nest within the outer section. Advantageously, the two sections are individually distinctly coloured from one another. The usual colouring for these show enclosures is black for the external walls and white for the internal walls. The door to the enclosure would be suitably coloured on the inner and outer surfaces.

The invention may be performed in various ways and a preferred embodiment will now be described, by way of example, with reference to the accompanying drawings, in which.

Figure 1:
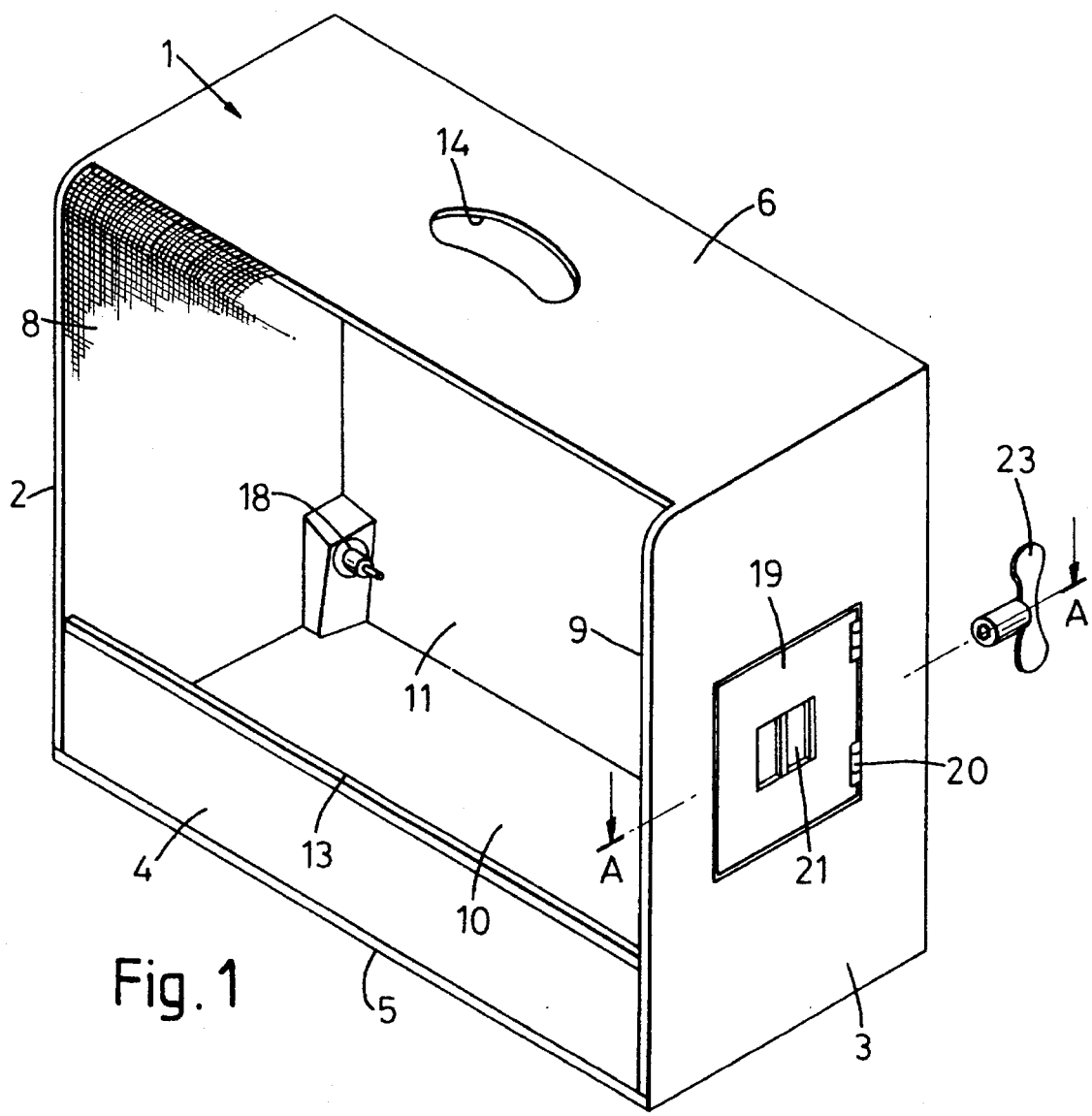
FIG. 1 is a front perspective view of a bird enclosure of this invention.
Figure 3:
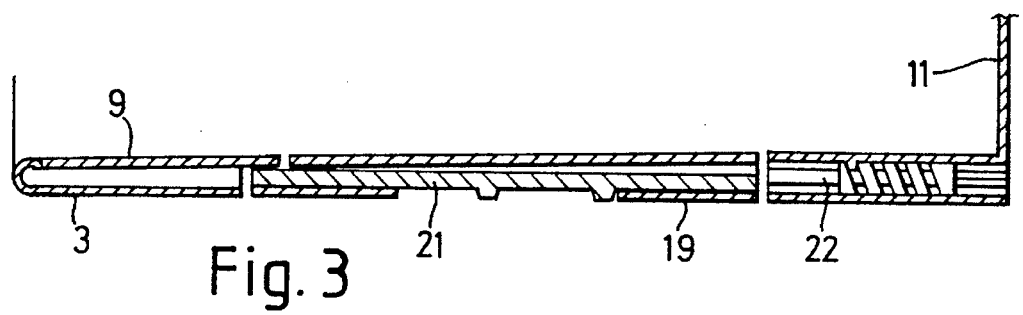
FIGS. 3 and 4 are horizontal sections on line A—A of FIG. 1 showing a door closure mechanism in two states.
Figure 2:
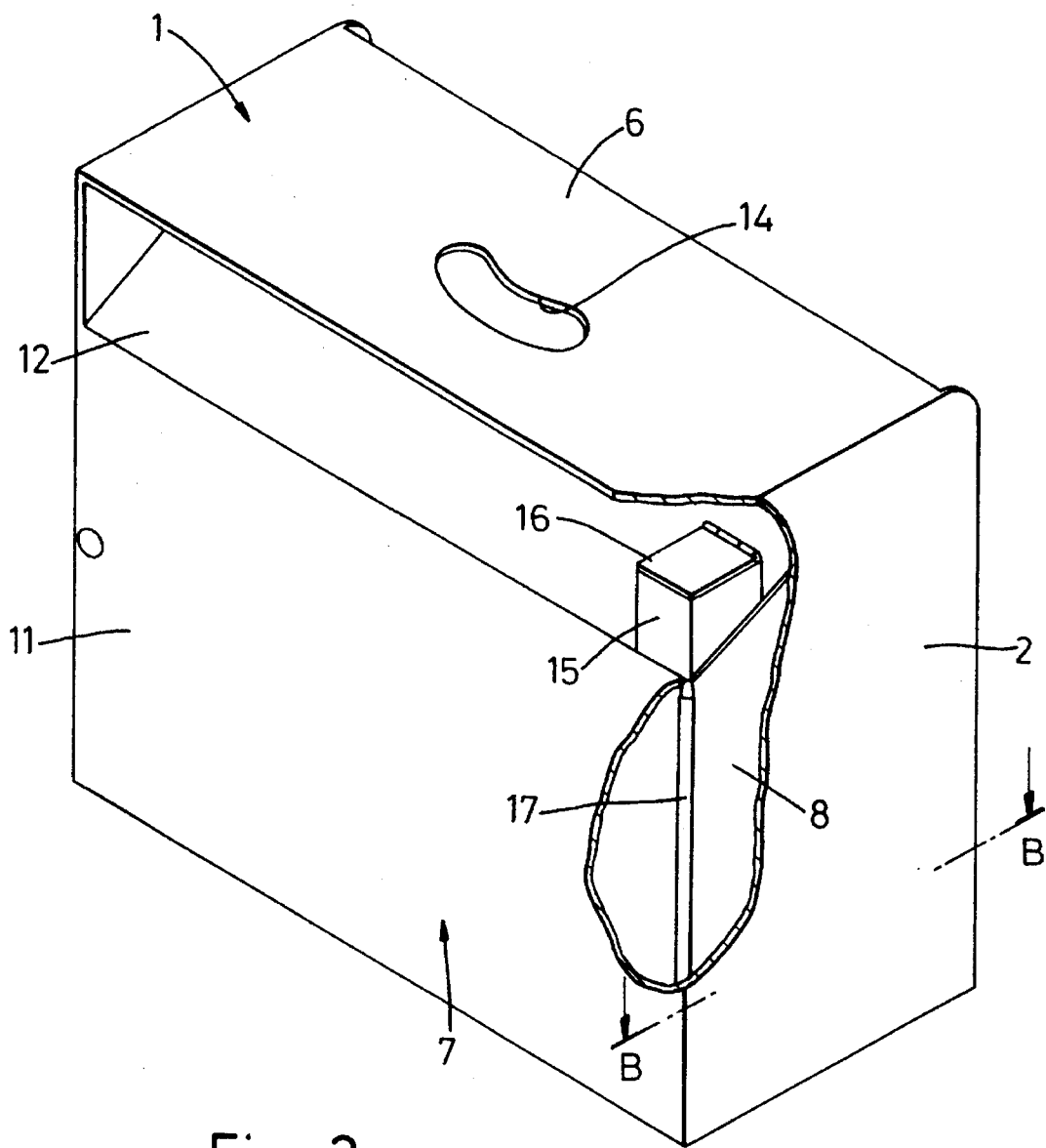
FIG. 2 is a rear perspective view (partly cut away) of the enclosure shown in FIG. 1.

Referring to FIGS. 1 and 2, the bird enclosure shown there is constructed from interengaging sections. The outer section 1 comprises two end walls 2 and 3, a front wall 4, a base wall 5 and a horizontal top wall 6. The inner section 7 comprises side walls 8 and 9, a base wall 10, a rear wall 11 and an inclined top wall 12. The outer section 1 is formed from a black coloured plastics material whilst the inner section is formed from a white coloured plastics material. Thus, when the two sections 1 and 7 are nested, one within the other, the interior of the enclosure will be white (except for the rear face of the front wall 4). The opening 13 at the front of the enclosure will be covered with mesh, thus providing a viewing panel. A cut-out 14 in the horizontal top wall 6 provides a hand grip into the cavity between the walls 6 and 12.

Figure 5:
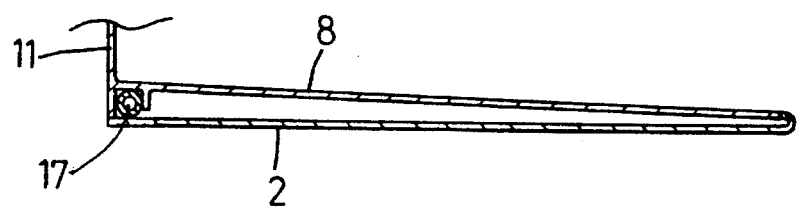
FIG. 5 is a horizontal section on line B—B of FIG. 1 through part of the enclosure.

The cavity between the walls 6 and 12 also provides a mounting space for a water reservoir 15, provided with an access lid 16. A feed tube 17 leads down from the reservoir 15 through the cavity between the overlapping side walls 2 and 8 (see FIG. 5). The other end of the tube 17 enters into a feed valve 18 within the enclosure.

Figure 4:
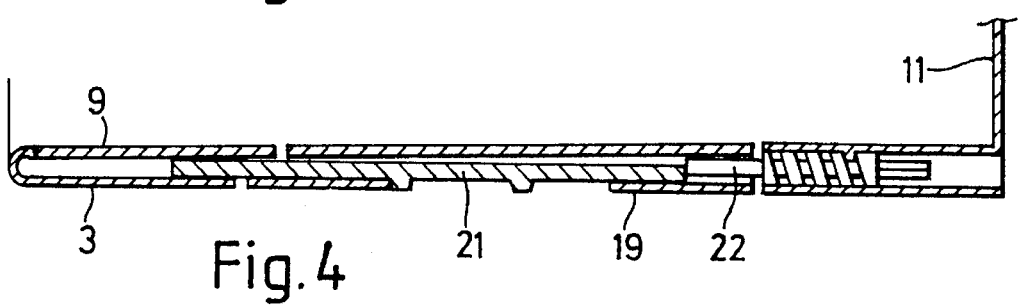

A door 19 is formed in the double wall 3,9 and is mounted by hinges 20 to the outer wall 3. A sliding latch panel 21 is formed within the body of the door 19 as can be seen from FIGS. 2 and 4. The far end of the latch panel 21 can be slid into the cavity between the walls 3 and 9 to hold the door in the closed position. A looking member is provided in the form of a screw-threaded rod 22 which can be operated by a key 23 to be driven forward into contact with the rear of the latch panel 21 to hold the door in the closed condition, as illustrated in FIG. 4. The locking member is accessible only from the rear of the enclosure so that when the enclosure is on display it will be difficult to access the locking member in order to release the door and thus acts as a deterrent to potential thieves.

Figure 6:
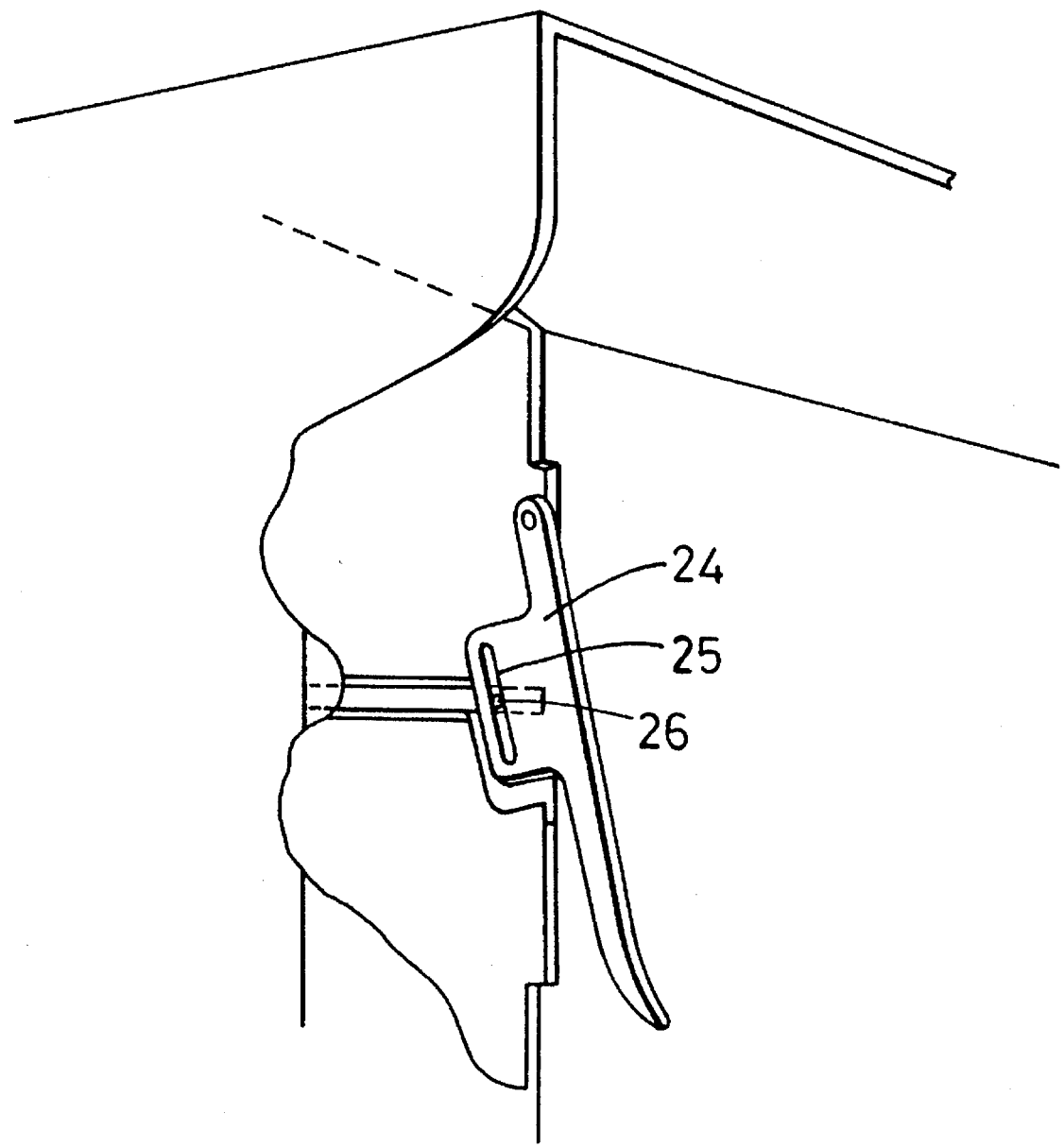
FIG. 6 shows an alternative locking system for a door of the enclosure.

The sliding latch panel 21 could be activated by the lever-operated pivoted arm 24 in FIG. 6, which incorporates a slot 25 in which slides a pin 26 attached to the panel 21.

I claim:

1. A bird enclosure of generally rectangular design having two side walls, a base, a top, a rear wall and a front wall, and formed from two interengaging sections which nest within one another to create a closed interior and at least one double side wall defining a cavity in that side wall, the front wall of the enclosure incorporating a mesh viewing panel, the enclosure also having a top interior wall which inclines downwardly from the front to the rear, the inclined wall being formed as part of one of the interengaging sections and a horizontal top wall extends as part of the other section from the front wall of the enclosure over the inclined wall.

2. An enclosure according to claim 1, wherein an outer one of the interengaging sections comprises said top, base, front and side walls and an inner one of the interengaging sections comprises said top, base, rear and side walls arranged to nest within the outer section.

3. An enclosure according to claim 2, wherein the two sections are individually distinctly coloured from one another.

4. A bird enclosure of generally rectangular design having two side walls, a base, a top, a rear wall and a front wall, and formed from two interengaging sections which nest within one another to create a closed interior and at least one double side wall defining a cavity in that side wall, the front wall of the enclosure incorporating a mesh viewing panel, a water reservoir mounted outside of the enclosure and having a supply tube leading from the reservoir through the side wall cavity to a feed valve within the enclosure, each section having a top wall and a space is defined between the two top walls and the water reservoir is incorporated in the space between the two top walls.

5. A bird enclosure of generally rectangular design having two side walls, a base, a top, a rear wall and a front wall, and formed from two interengaging sections which nest within one another to create a closed interior and at least one double side wall defining a cavity in that side wall, the front wall of the enclosure incorporating a mesh viewing panel, a door formed in one of the side walls and an integral latch on the door is positioned to slide into the side wall cavity in order to lock the door and a locking member is provided which can be actuated to drive the latch into or retain the latch in a closed condition.

6. An enclosure according to claim 5, wherein the locking member is a screw-threaded bolt actuable by a key, or a lever-operated arm acting in the latch.

7. An enclosure according to claim 5, wherein the locking member is arranged to be actuated from the rear of the enclosure.

8. An enclosure according to claim 5, wherein the locking member is a lever-operated arm acting on the latch.

* * * * *